(12) United States Patent
Schroeder

(10) Patent No.: US 6,511,112 B2
(45) Date of Patent: *Jan. 28, 2003

(54) MAGNETIC REMOTE-RETRIEVAL DEVICE

(76) Inventor: James A. Schroeder, 1736 W. Rovey, Phoenix, AZ (US) 85015

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/552,891

(22) Filed: Apr. 20, 2000

(65) Prior Publication Data

US 2002/0153734 A1 Oct. 24, 2002

Related U.S. Application Data

(63) Continuation of application No. 09/324,378, filed on Jun. 2, 1999, now Pat. No. 6,073,983.

(51) Int. Cl.[7] .............................. B66C 1/04; B25F 1/00; G01B 3/10
(52) U.S. Cl. .................. 294/65.5; 294/1.1; 33/758; 33/770
(58) Field of Search ................................ 294/65.5, 1.1, 294/19.1, 66.1; 33/770, 755, DIG. 1, 760, 758, 759; 7/164, 901; 335/285, 291, 293, 296, 302–306; 209/215, 216, 217

(56) References Cited

U.S. PATENT DOCUMENTS

| 2,663,941 A | * | 12/1953 | Dart | 33/768 |
| 2,711,030 A | * | 6/1955 | Drew et al. | 33/758 |
| 2,932,538 A | * | 4/1960 | Holmes | 294/65.5 |
| 3,032,363 A | * | 5/1962 | Clayborne | 294/65.5 |
| 3,036,791 A | * | 5/1962 | Siggelkow | 33/394 |
| 3,100,937 A | * | 8/1963 | Rurch | 33/770 |
| 3,141,696 A | * | 7/1964 | Nau | 294/19.2 |
| 3,145,477 A | * | 8/1964 | Morrison | 33/770 |
| 3,169,791 A | * | 2/1965 | Twachtman | 294/65.5 |
| 3,204,155 A | * | 8/1965 | Charpentier | 335/296 |
| 3,477,050 A | * | 11/1969 | Hinger | 294/65.5 |
| 3,646,492 A | * | 2/1972 | Westermann | 335/285 |
| 3,662,471 A | * | 5/1972 | Lunde | 33/770 |

(List continued on next page.)

FOREIGN PATENT DOCUMENTS

| JP | 0120902 | * | 7/1984 | 33/758 |
| JP | 0155903 | * | 8/1985 | 33/758 |
| JP | 406281401 | * | 10/1994 | 33/755 |
| JP | 410030901 | * | 3/1998 | |
| JP | 11044501 | * | 2/1999 | |
| SU | 534408 | * | 2/1977 | 294/65.5 |

Primary Examiner—Christopher P. Ellis
Assistant Examiner—Paul T. Chin
(74) Attorney, Agent, or Firm—Meschkow & Gresham, PLC; Jordan M. Meschkow; Lowell W. Gresham

(57) ABSTRACT

A device (20) for the retrieval of a ferromagnetic object (22) from a remote area is provided. The device (20) contains a retractable tape measure (24) and a magnetic gripping head (26). The tape measure (24) has a blade (30) with a first end (64), an opposing second end (66), a longitudinal axis (68) extending between the first and second ends (64,66), and a zero hook (32) coupled to the first end (64). The gripping head (26) has a housing with a gripping opening (40) in a face (42) thereof and a coupling opening (62) in another face (70) thereof. The gripping head (26) also has a magnet (38) within the housing (34). The housing (34) and magnet (38) are configured so that a portion of the magnet (38) protrudes through the gripping opening (40) to effect magnetic engagement with the ferromagnetic object (22) during retrieval. The zero hook (32) of the tape measure (24) is removably fastened to the gripping head (26) through the coupling opening (62) in the housing (34) to effect retrieval of the ferromagnetic object (22).

16 Claims, 2 Drawing Sheets

U.S. PATENT DOCUMENTS

| | | | | |
|---|---|---|---|---|
| 4,103,426 A | * | 8/1978 | Robin | 33/27.03 |
| 4,353,167 A | * | 10/1982 | Martin | 33/770 |
| 4,379,176 A | * | 4/1983 | Bouchara et al. | 335/284 |
| 4,554,703 A | * | 11/1985 | Matuki | 7/901 |
| 4,813,729 A | * | 3/1989 | Speckhart | 294/65.5 |
| 4,827,622 A | * | 5/1989 | Maker | 33/770 |
| 4,843,361 A | * | 6/1989 | Couvreur et al. | 335/229 |
| 4,924,597 A | * | 5/1990 | Tursi | 33/758 |
| 5,103,574 A | * | 4/1992 | Levy | 33/760 |
| 5,172,486 A | * | 12/1992 | Waldherr | 33/770 |
| 5,388,877 A | * | 2/1995 | Wenk | 294/1.1 |
| 5,402,583 A | * | 4/1995 | Komura | 33/758 |
| 5,421,100 A | * | 6/1995 | Leore | 33/758 |
| 5,458,946 A | * | 10/1995 | White, Jr. | 33/770 |
| 5,481,313 A | * | 1/1996 | Templeton | 33/770 |
| 5,799,999 A | * | 9/1998 | Schneider et al. | 294/65.5 |
| 5,810,409 A | * | 9/1998 | Hardie | 294/65.5 |
| 5,815,940 A | * | 10/1998 | Valentine, Sr. | 33/770 |
| 6,082,017 A | * | 7/2000 | Simar | 33/755 |

\* cited by examiner

MAGNETIC REMOTE-RETRIEVAL DEVICE

RELATED INVENTION

The present invention is a continuation of "Magnetic Remote-Retrieval Device," U.S. patent application Ser. No. 09/324,378, filed Jun. 2, 1999, now U.S. Pat. No. 6,073,983, which is incorporated by reference herein.

TECHNICAL FIELD OF THE INVENTION

The present invention relates to the field of remote-retrieval devices. More specifically, the present invention relates to devices for the remote retrieval of ferromagnetic objects by magnetic attraction.

BACKGROUND OF THE INVENTION

When working, it is often the case that a part or tool will be dropped. Such a dropped object will often come to rest in an area not readily accessible without difficulty or excessive effort. For example, while cutting and forming a vent flashing during the construction of a roof, the worker may drop the flashing (or the cutters) off the roof. The worker would then be obliged to climb down to retrieve the dropped object, then climb back up to the roof to continue the work. This action represents a radical interruption of the work in progress.

What is needed, therefore, is a tool for the retrieval of a dropped object without necessitating radical interruption of the work in progress.

Conventional magnetic remote-retrieval devices are known to those skilled in the prior art. However, such conventional devices suffer from two primary drawbacks, insufficient reach and insufficient magnet strength. Devices with a reasonable reach, i.e., with extensible members of a reasonable length, are awkward to carry. That is, such devices fit conveniently into neither a pocket nor an apron, and occupy an inordinate amount of space in a toolbox. As a result, such devices are rarely carried, hence not present when an object is dropped. Having to fetch the device is itself a radical interruption of the work in progress. Such devices are useful, therefore, only when an object is dropped into an otherwise inaccessible location, such as inside a wall.

For those devices designed to fit conveniently into a toolbox, the dimensions of the extensible member are such that only a short reach, typically under three feet, is feasible. Also, the scale of dimensions necessitates the use of a small, hence relatively weak, magnet. Such devices are only useful for small objects (nuts, bolts, etc.) dropped into relatively close otherwise inaccessible areas, such as inside a half wall or into a close corner.

What is needed, therefore, is a tool for the retrieval of an object of reasonable mass over a considerable distance, often greater than ten feet, without necessitating radical interruption of the work in progress.

It is only when the retrieval distance is small, e.g., a few feet down inside a wall, that retrieval may be accomplished through a typical prior-art magnetic or mechanical retrieval wand. Even this, however, requires that the wand be at hand. Such wands are typically of the "pencil" variety when not extended. In theory, a pencil-type device would be easily carried in a pocket or apron. In practice, however, spaces for pencils and other thin clip-on devices are at a premium. The result is that the worker would typically carry such a device in a toolbox, not a pocket. This necessitates that the worker fetches the device from the toolbox, often not proximate the worksite, to effect the retrieval.

What is needed, therefore, is a tool for the retrieval of a dropped object, wherein the device is of a small enough size to be carried without becoming a burden or annoyance to the worker, without displacing another tool, and possessing an extensive reach and a reasonable lifting capacity.

SUMMARY OF THE INVENTION

Accordingly, it is an advantage of the present invention that a magnetic remote-retrieval device is provided.

It is another advantage of the present invention that a device is provided that incorporates an easily carried magnetic gripping head for attachment to a retractable measuring tape.

It is another advantage of the present invention that a method of remotely retrieving an object is provided.

The above and other advantages of the present invention are carried out in one form by a device for the retrieval of a ferromagnetic object from a remote area by magnetic attraction. The device incorporates a housing having a plurality of faces, having a first opening in a first one of those faces, and having a second opening in a second one of those faces, and a magnet contained within the housing.

The above and other advantages of the present invention are carried out in another form by a method for the remote retrieval of an object having a ferromagnetic portion by a magnetic remote-retrieval device having a magnetic gripping head and a retractable tape measure. The method includes the operations of fastening the magnetic gripping head to the tape measure, extending a blade of the tape measure to cause the magnetic gripping head to approach the object, capturing the object with the magnetic gripping head, retracting the blade of the tape measure, and retrieving the object.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
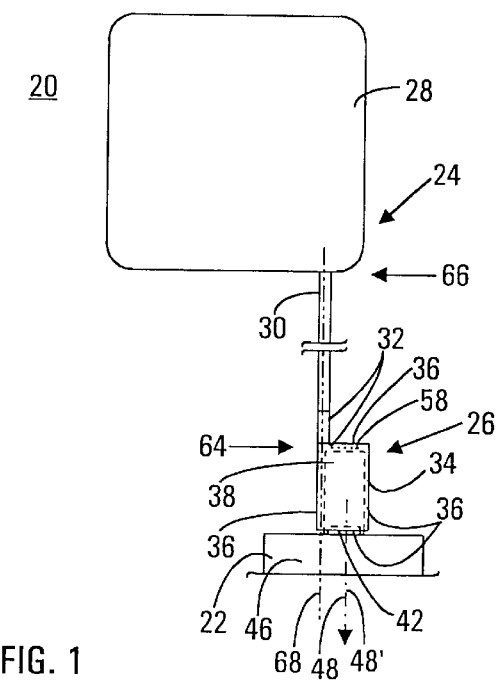
FIG. 1 shows a side view depicting a magnetic remote-retrieval device coupled to a ferromagnetic object in a longitudinal position in accordance with a preferred embodiment of the present invention.
Figure 2:
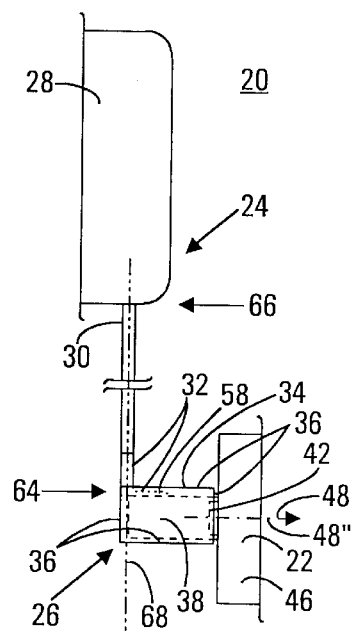
FIG. 2 shows a side view depicting a magnetic remote-retrieval device coupled to a ferromagnetic object in a transverse position in accordance with a preferred embodiment of the present invention.

FIGS. 1 and 2 show side views depicting a magnetic remote-retrieval device 20 coupled to a ferromagnetic object 22 in a longitudinal position (FIG. 1) and a transverse position (FIG. 2) in accordance with a preferred embodiment of the present invention. The following discussion refers to FIGS. 1 and 2.

Magnetic remote-retrieval device 20 is made up of an extension apparatus 24 coupled to a magnetic gripping head 26. In the preferred embodiments depicted in the Figures, extension apparatus 24 is a retractable steel tape measure 24 of the type used by those in the construction and service industries. Those skilled in the art will appreciate that an extension apparatus 24 other than a tape measure may be used without departing from the spirit of the present invention. However, a tape measure is a preferred extension apparatus 24 in that it is a normally carried tool for most individuals involved in construction and/or service, thus eliminating the need to carry a dedicated extension apparatus 24.

Extension apparatus 24 has a body 28 containing an extension member 30 that terminates in a fastening member 32. In this discussion, the use of a retractable steel tape measure is assumed for extension apparatus 24. Therefore, extension apparatus 24 is hereinafter tape measure 24, body 28 is case 28, extension member 30 is blade 30, and fastening member 32 is zero hook 32.

Figure 3:
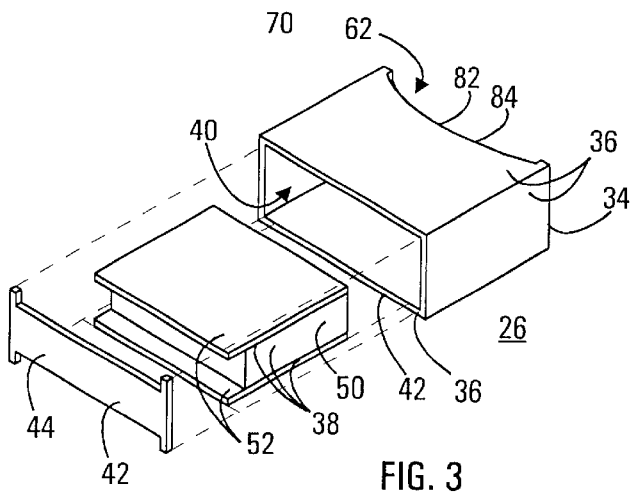
FIG. 3 shows an exploded isometric view depicting a magnetic gripping head for a magnetic remote-retrieval device in accordance with a preferred embodiment of the present invention.

FIG. 3 shows an exploded isometric view depicting gripping head 26 in accordance with a preferred embodiment of the present invention. The following discussion refers to FIGS. 1 through 3.

Gripping head 26 is configured to be easily carried in a pocket, in a toolbox, or on a toolbelt, making it readily available for use with tape measure 24. Tape measure 24 is assumed to be already present as a part of an individual's normal compliment of tools.

Tape measure 24 is coupled to gripping head 26. In the preferred embodiments depicted in the Figures, gripping head 26 is made up of a housing 34 having a plurality of faces 36. As depicted, housing 34 is in the form of an orthogonal parallelepiped having six faces 36, but those skilled in the art will appreciate that many other forms may be used for housing 34, including irregular forms (e.g., forms shaped as manufacturer's logos or for promotional purposes), and forms having such a multiplicity of faces 36 as to appear curved or even spherical.

Housing 34 contains a magnet 38. Magnet 38 is configured to protrude through a gripping opening 40 in a gripping face 42. In the preferred embodiment of FIG. 3, gripping opening 40 also serves as the opening through which magnet 38 is inserted into housing 34 during the assembly of gripping head 26. This is not a requirement of the present invention, however, and other means of placing magnet 38 inside of housing 34 may be used without departing from the spirit of the present invention.

A retainer 44 is used to retain magnet 38 within housing 34. In the preferred embodiment of FIG. 3, retainer 44 is depicted as an "I"-shaped clip attached to housing 34 so as to become a part of gripping face 42. Retainer 44 divides gripping opening 40 into two correlated gripping openings 40 in gripping face 42. Those skilled in the art will appreciate, however, that any of a multitude of other retainers 44 may be used, and that the use of a given retainer does not depart from the spirit of the present invention.

Figure 4:
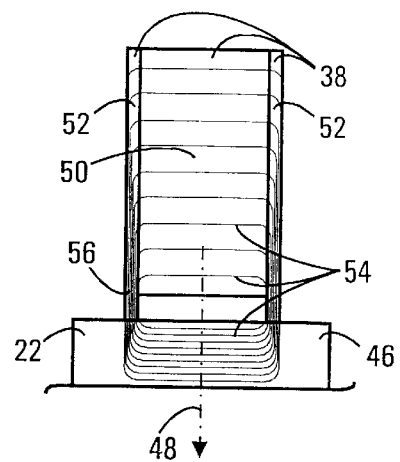
FIG. 4 shows a schematic view depicting the magnetic coupling between a magnet from a magnetic gripping head of a magnetic remote-retrieval device and a portion of a ferromagnetic object in accordance with a preferred embodiment of the present invention.

FIG. 4 shows a schematic view depicting the magnetic coupling between magnet 38 and a portion of object 22 in accordance with a preferred embodiment of the present invention. For the sake of clarity, FIG. 4 omits housing 34. The following discussion refers to FIGS. 1 through 4.

Magnet 38 protrudes through gripping opening(s) 40 to contact object 22. Ferromagnetic object 22 is the object to be retrieved, at least a-portion 46 of which is ferromagnetic, i.e.,.capable of being attracted by a conventional magnet. Magnet 38 is configured so that an attractive force (not shown) of magnet 38 is concentrated in an operating direction 48 perpendicular to gripping face 42. In the preferred embodiments, magnet 38 is made up of a magnetic core 50, typically of alnico or ceramic, sandwiched between a pair of pole pieces 52. As demonstrated in FIG. 4, pole pieces 52 serve to concentrate the lines of magnetic flux 54 of core 50 so as to produce the attractive force proximate and perpendicular to gripping face 42. Once pole pieces 52 contact ferromagnetic portion 46 of object 22, the lines of flux 54 complete a magnetic circuit 56, causing magnet 38 to establish and maintain a strong grip upon object 22.

Object 22, as used in this discussion, refers to an object to be retrieved from a remote or partially inaccessible location by device 20. Object 22 has at least a portion thereof made up of a ferromagnetic substance, i.e., a substance capable of being attracted by a magnet, e.g., iron, nickel, cobalt, or some alloy thereof. Object 22 need not be completely ferromagnetic. For example, a screwdriver with a plastic handle and a steel blade might be object 22, as might be other tools, fasteners, etc., made of or containing parts made of a ferromagnetic substance.

Figure 5:
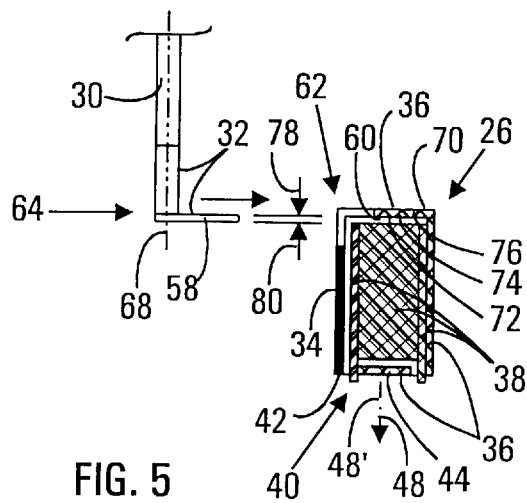
FIG. 5 shows a cutaway side view depicting the insertion of a fastening member tab into a space in a magnetic gripping head for a longitudinal operating direction of a magnetic remote-retrieval device in accordance with a preferred embodiment of the present invention.
Figure 6:
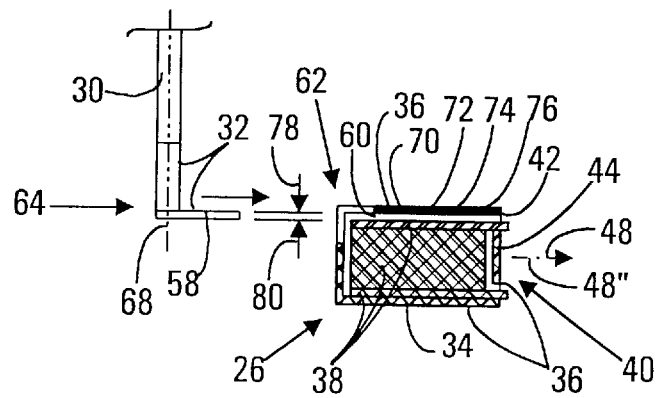
FIG. 6 shows a cutaway side view depicting the insertion of a fastening member tab into a space in a magnetic gripping head for a transverse operating direction of a magnetic remote-retrieval device in accordance with a preferred embodiment of the present invention.
Figure 7:
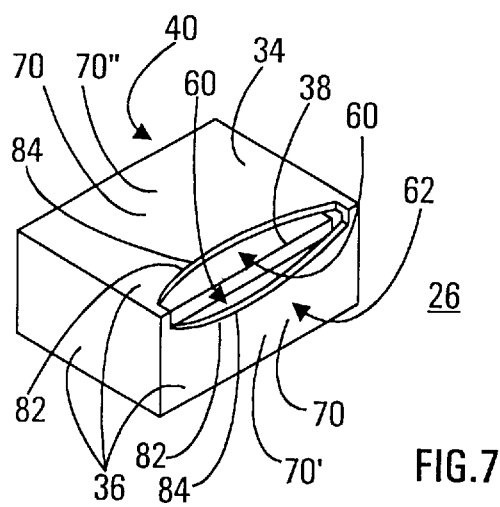
FIG. 7 shows a rear isometric view depicting a coupling opening and related spaces of a magnetic gripping head of a magnetic remote-retrieval device in accordance with a preferred embodiment of the present invention.

FIGS. 5 and 6 show cutaway side views depicting the insertion of a tab 58 of zero hook 32 into a space 60 in gripping head 26 through a coupling opening 62 of housing 34 for a longitudinal operating direction 48' (FIG. 5) and a transverse operating direction 48" (FIG. 6) of device 20, and FIG. 7 shows a rear isometric view depicting coupling opening 62 and spaces 60, in accordance with a preferred embodiment of the present invention. The following discussion refers to FIGS. 1, 2, 3, 5, and 6.

Zero hook 32 is affixed to a first end 64 of blade 30. A second end 66 of blade 30 occurs where blade 30 enters case 28. That is, blade 30 is, for the purposes of this discussion, that portion of the physical blade of tape measure 24 that is extended beyond case 28. A longitudinal axis 68 of blade 30 extends between and beyond first blade end 64 and second blade end 66.

Tape measure 24 is coupled to gripping head 26 by the insertion of tab 58 of zero hook 32 through coupling opening 62 and into tab insertion space 60 within housing 34. In the preferred embodiment of FIGS. 1 and 5, gripping head 26 couples to tape measure 24 so that operating direction 48 of the attractive force (not shown) is a longitudinal operating direction 48', i.e., is substantially parallel to longitudinal axis 68. In the preferred embodiment of FIGS. 2 and 6, gripping head 26 couples to tape measure 24 so that operating direction 48 is a transverse operating direction 48", i.e., is substantially perpendicular to longitudinal axis 68. Those skilled in the art will appreciate that other operating directions 48 are possible, and that the use of one of these other operating directions 48 does not depart from the spirit of the present invention.

For longitudinal operating direction 48' (FIGS. 1 and 5), coupling opening 62 is located in a coupling face 70 of housing 34 substantially opposite gripping face 42. Space 60 is located between magnet 38 and an inner surface 72 of a wall 74 of housing 34 whose outer surface 76 is coupling face 70. Tab 58 is inserted through coupling opening 62 and into space 60. Magnetic attraction from magnet 38 retains tab 58 in space 60.

Additionally, housing 34 and magnet 38 may be configured so that a cross-sectional dimension 78 of space 60 is substantially equal to a cross-sectional dimension 80 of tab 58. That is, the "thickness" of space 60 is substantially equal to the thickness of tab 58. By making dimensions 78 and 80 substantially equal, tab 58 is also retained within space 60 by friction.

For transverse operating direction 48" (FIGS. 2 and 6), coupling opening 62 is located in a coupling face 70 of housing 34 substantially perpendicular to gripping face 42. Space 60 is located between magnet 38 and inner surface 72 of wall 74 of coupling face 70. Tab 58 is inserted through coupling opening 62 and into space 60. Magnetic attraction and/or friction retain tab 58 in space 60.

As depicted in FIG. 7, coupling opening 62 may involve two faces 36 of housing 34. In this embodiment, a second face 36 substantially opposite gripping face 42 is a longitudinal coupling face 70' while an adjacent third face 60 substantially perpendicular to gripping face 42 is a transverse coupling face 70". To couple gripping head 26 in longitudinal operating direction 48', tab 58 is passed through coupling opening 62 and inserted into space 60 between inner surface 72 of wall 74 of longitudinal coupling face 70'. To couple gripping head 26 in transverse operating direction 48", tab 58 is passed through coupling opening 62 and inserted into space 60 between inner surface 72 of wall 74 of transverse coupling face 70".

Blade 30 typically has a transverse curve (not shown). This transverse curve serves to stiffen blade 30 in normal use (i.e., as a tape measure). To more fully engage tab 58 of zero hook 32 into space 60, it is desirable that an edge 82 of coupling opening 62 have a concave curve 84 to accept the curve of blade 30. Curve 84 also serves to keep zero hook 32 centered. This in turn helps to keep zero hook 32 fully engaged into space 60 while fishing for, capturing, and retrieving the dropped object. If gripping head 26 is produced for use with a specific tape measure 24, i.e., when produced by a single manufacturer and/or sold as a complementary set (e.g., when bubble-packed together), then concave curve 84 of coupling opening 62 should desirably be substantially identical to the curve of blade 30.

If, in the course of a normal task, an individual were to drop object 22 into a remote or normally inaccessible area (a hammer falls off a roof or a special fastener falls inside a wall), the individual may use magnetic remote-retrieval device 20 to retrieve the dropped object.

To accomplish this retrieval, the individual first fastens gripping head 26 to tape measure 24. This is effected by inserting zero hook 32 into coupling opening 62 in housing 34. Tab 58 is then inserted into space 60 between magnet 38 and inner surface 72 of wall 74 of coupling face 70, where it is retained by magnetic attraction and/or friction.

The individual then extends blade 30 to cause gripping head 26 to approach object 22, e.g., down over the edge of the roof or down inside the wall.

The individual then captures object 22 with gripping head 26. This may be accomplished by maneuvering blade 30 to place gripping head 26 adjacent object 22, contacting object 22 with gripping head 26 so as to establish a magnetic bond between ferromagnetic portion 46 of object 22 and magnet 38, and suspending and lifting object 22 by device 20 (i.e., by gripping head 26 and blade 30).

The individual then retracts blade 30, bringing object 22 within reach, and retrieves object 22. The individual may then disconnect gripping head 26 from tape measure 24 and proceed with his/her interrupted task.

In summary, the present invention teaches a magnetic remote-retrieval device 20 made up of a magnetic gripping head 26 and a retractable tape measure 24. Magnetic gripping head is configured to be easily carried and instantly available for use with tape measure 24, which is already present as a part of an individual's normal compliment of tools. Through the use of device 20, an individual may readily and easily retrieve a dropped object 22, at least a portion 46 of which is ferromagnetic, with a minimal interruption of the task in process.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A magnetic remote-retrieval device configured to effect the retrieval of a ferromagnetic object from a remote area by magnetic attraction, said magnetic remote-retrieval device comprising:
   a retractable tape measure comprising:
      a blade; and
      a zero hook affixed to an end of said blade; and
   a magnetic gripping head comprising:
      a housing having a first opening and a second opening, wherein said magnetic gripping head is removably fastened to said zero hook through said second opening during said retrieval; and
      a magnet having a magnetic core contained within said housing and having a plurality of pole pieces in contact with said magnetic core, wherein portions of said pole pieces protrude through said first opening to effect magnetic engagement with said ferromagnetic object during said retrieval.

2. A magnetic remote-retrieval device as claimed in claim 1 wherein said housing comprises a retainer configured to retain said magnetic core within said housing.

3. A magnetic remote-retrieval device as claimed in claim 1 wherein said blade of said retractable tape measure has a first end, a second end opposing said first end, and a longitudinal axis extending between said first end and said second end, and said zero hook is affixed to said first end of said blade, and wherein said magnetic gripping head is configured to couple to said zero hook.

4. A magnetic remote-retrieval device as claimed in claim 3 wherein:
   said first opening is in a face of said housing;
   said housing is configured so that said magnet exerts an attractive force upon said ferromagnetic object in an operating direction which is substantially perpendicular to said face; and
   said housing is additionally configured so that said zero hook couples said blade to said magnetic gripping head so that said operating direction is substantially parallel to said longitudinal axis of said blade.

5. A magnetic remote-retrieval device as claimed in claim 3 wherein:

said first opening is in a face of said housing;

said housing is configured so that said magnet exerts an attractive force upon said ferromagnetic object in an operating direction which is substantially perpendicular to said face; and said housing is additionally configured so that said zero hook couples said blade to said magnetic gripping head so that said operating direction is substantially perpendicular to said longitudinal axis of said blade.

6. A magnetic remote-retrieval device as claimed in claim 1 wherein:

said housing is configured so that a space is formed between said magnet and an inside wall of said housing proximate said second opening;

said retractable tape measure is coupled to said magnetic gripping head by insertion of a tab of said zero hook into said second opening of said housing so as to occupy said space; and said housing and said magnet are configured so that said tab is retained within said space by magnetic attraction.

7. A magnetic remote-retrieval device as claimed in claim 6 wherein:

said space has a cross-sectional dimension approximately equal to a cross-sectional dimension of said tab; and said housing and said magnet are configured so that said tab is additionally retained within said space by friction.

8. A method for the remote retrieval of an object having a ferromagnetic portion by a magnetic remote-retrieval device having a magnetic gripping head and a retractable tape measure, wherein said magnetic gripping head includes a housing containing a magnet, wherein said magnet is formed of a magnetic core and a plurality of pole pieces, and wherein said pole pieces are in contact with said magnetic core and at least partially protrude from said housing, said method comprising:

fastening said magnetic gripping head to a zero hook of said tape measure;

extending a blade of said tape measure to cause said magnetic gripping head to approach proximate said object;

maneuvering said blade of said tape measure to place said magnetic gripping head adjacent said ferromagnetic portion of said object;

contacting said ferromagnetic portion of said object with said protruding pole pieces;

completing a magnetic circuit between said object and said magnet through said pole pieces;

lifting said object by said magnetic gripping head and said blade of said tape measure so as to suspend said object from said device;

retracting said blade of said tape measure; and retrieving said object.

9. An object-retrieval method as claimed in claim 8 wherein said magnetic gripping head includes a magnet held at least partially within a housing and said fastening operation comprises:

inserting said zero hook of said tape measure into an opening in said housing; and retaining said zero hook within said opening by one of magnetic attraction and friction.

10. An object-retrieval method as claimed in claim 8 additionally comprising disconnecting, after said retrieving operation, said magnetic gripping head from said tape measure.

11. A device for the remote magnetic retrieval of an object having a ferromagnetic portion, said device comprising:

a retractable tape measure having a blade, a zero hook affixed to an end of said blade, and a tab upon said zero hook; and a magnetic gripping head having a housing and a magnet contained within said housing, wherein said magnetic gripping head is removably coupled to said zero hook by friction and magnetic attraction when said tab is placed in a space between a wall of said housing and said magnet.

12. A device as claimed in claim 11 wherein said housing has a plurality of openings, and wherein said magnetic gripping head comprises:

a magnetic core contained within said housing; and a plurality of pole pieces coupled to said magnetic core, wherein a portion of at least one of said pole pieces protrudes from said housing through one of said openings.

13. A device as claimed in claim 12, wherein said gripping head comprises a pair of said pole pieces sandwiching said magnetic core and protruding from said housing in a substantially identical direction.

14. A device as claimed in claim 13 wherein, during retrieval of said object, said pair of said pole pieces contact said object so as to complete a magnetic circuit through said ferromagnetic portion thereof.

15. A device as claimed in claim 11 wherein:

said housing has a coupling opening and said magnet is substantially contained within said housing; and said tab of said zero hook engages said magnet through said coupling opening so as to be frictionally and magnetically bound within a space between said magnet and said housing.

16. A device for the retrieval of a ferromagnetic object from a remote area by magnetic attraction, said device comprising:

an extension apparatus having an extension member with a first end, a second end opposing said first end, and a longitudinal axis extending between said first end and said second end, and having a fastening member affixed to said first end; and a magnetic gripping head comprising:

a housing having a first opening and a second opening, wherein said extension apparatus is removably fastened to said magnetic gripping head by said fastening member; and a magnet having a magnetic core contained within said housing, and having a plurality of pole pieces coupled to said magnetic core, wherein a portion of at least one of said pole pieces protrudes from said housing through said second opening to effect magnetic engagement with said ferromagnetic object.

* * * * *